United States Patent
Tran

(10) Patent No.: US 6,667,968 B1
(45) Date of Patent: Dec. 23, 2003

(54) SYSTEM AND METHOD FOR PROVIDING MULTIPLE ENDPOINTS IN A DEVICE DISPOSED IN A PACKET-SWITCHED NETWORK

(75) Inventor: Hung Tran, Town of Mount Royal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/346,769

(22) Filed: Jul. 7, 1999

Related U.S. Application Data

(60) Provisional application No. 60/110,811, filed on Dec. 3, 1998.

(51) Int. Cl.[7] ............................................... H04L 12/60
(52) U.S. Cl. ........................................................ 370/352
(58) Field of Search ................................. 370/352–401, 370/329, 349, 328–338, 260, 270, 390–395, 252, 465, 400, 466, 259, 384, 522; 709/227–238, 315, 217, 263, 220; 705/26; 379/221, 88.17, 219, 93.24, 212.01, 258, 229–231, 265.02, 265.09; 348/14.09, 14.08

(56) References Cited

U.S. PATENT DOCUMENTS

| | | | | |
|---|---|---|---|---|
| 6,031,896 A | * | 2/2000 | Gardell et al. ............ | 379/88.17 |
| 6,067,529 A | * | 5/2000 | Ray et al. .................... | 705/26 |
| 6,128,298 A | * | 10/2000 | Wootton et al. ............ | 370/392 |
| 6,144,671 A | * | 11/2000 | Perinpanathan et al. .... | 370/409 |
| 6,157,401 A | * | 12/2000 | Wiryaman ................... | 348/15 |
| 6,282,581 B1 | * | 8/2001 | Moore et al. ............... | 709/330 |
| 6,373,857 B1 | * | 4/2002 | Ma ............................. | 370/475 |
| 6,374,302 B1 | * | 4/2002 | Galasso et al. ............. | 709/238 |
| 6,421,339 B1 | * | 7/2002 | Thomas ...................... | 370/352 |
| 6,446,127 B1 | * | 9/2002 | Schuster et al. ............ | 709/227 |
| 6,449,260 B1 | * | 9/2002 | Sassin et al. ............... | 370/270 |
| 6,452,915 B1 | * | 9/2002 | Jorgensen ................... | 370/338 |

* cited by examiner

*Primary Examiner*—Chi Pham
*Assistant Examiner*—Prenell Jones
(74) *Attorney, Agent, or Firm*—Smith & Danamraj, PC

(57) ABSTRACT

A system and method for providing multiple endpoints in a single proxy device disposed in a packet-switched network system comprising a gatekeeper. The proxy device is configured with an alias address and transport address. Each endpoint is provided with its own alias address also. When the proxy device is registered at the gatekeeper, a registry table therein is updated by creating an association between the proxy device's transport and alias addresses. For each endpoint that is powered up, a Registration Request message is sent from the proxy device to the gatekeeper. The Registration Request message includes the alias address of the endpoint. In response, the registry table in the gatekeeper is updated by creating an association between the transport address of the proxy device and the endpoint's alias address received, without replacing or deleting previous associations between the proxy device's transport address and other alias addresses.

13 Claims, 4 Drawing Sheets

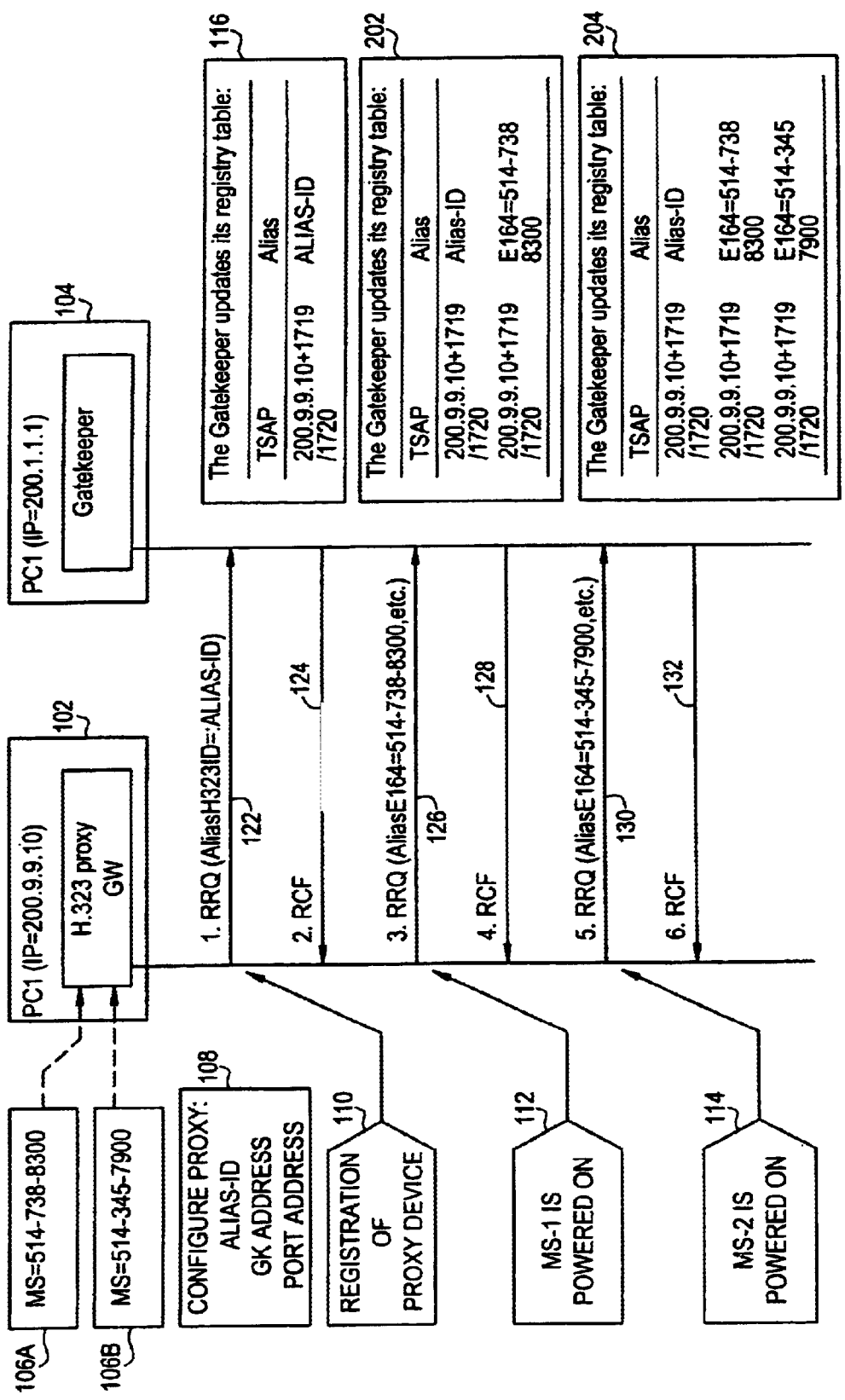

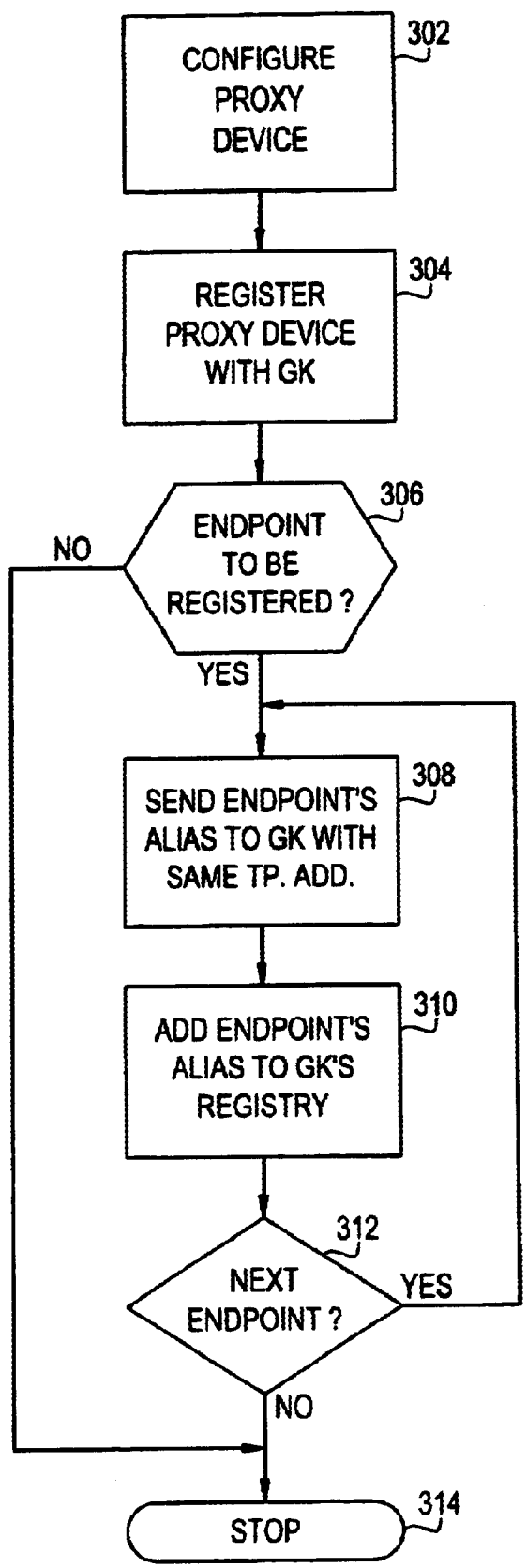

SYSTEM AND METHOD FOR PROVIDING MULTIPLE ENDPOINTS IN A DEVICE DISPOSED IN A PACKET-SWITCHED NETWORK

PRIORITY STATEMENT UNDER 35 U.S.C §119(e) & 37 C.F.R. §1.78

This nonprovisional application claims priority based upon the following prior U.S. provisional patent application entitled: "System and Method for Providing Mobile Stations in a Radio Telecommunications Network with Multimedia Services over Packet-Based Networks," Ser. No. 60/110,811, filed Dec. 3, 1998, in the names of: Hung Tran, Kim Vo, Bartosz Balazinski, Jean-Francois Bertrand, Laura Hernandez, and Suhail Hasan.

CROSS-REFERENCE TO RELATED APPLICATIONS

This application discloses subject matter related to the subject matter disclosed in the following co-assigned patent applications: (1) "System and Method for Providing Wireless Telephony over a Packet-Switched Network," filed Oct. 26, 1999, Ser. No. 09/426,513, in the names of: Hung Tran, Bartosz Balazinski, Jean-Francois Bertrand, Laura Hernandez, and Francis Lupien; (2) "System and Method for Providing Wireless Telephony over a Packet-Switched Network," filed Oct. 26, 1999, Ser. No. 09/427,508, in the names of: Kim Vo, Hung Tran, Laura Hernandez, Jean-Francois Bertrand, Bartosz Balazinski, George Foti, Francis Lupien, Zeng-Jun Xiang, and Yang Lu.

BACKGROUND OF THE INVENTION

1. Technical Field of the Invention

The present invention relates to integrated telecommunication systems and, more particularly, to a system and method for supporting multiple endpoints in a single device disposed in a packet-switched network such as, for example, a network using the Internet Protocol (IP).

2. Description of Related Art

Coupled with the phenomenal growth in popularity of the Internet, there has been a tremendous interest in using packet-switched network infrastructures (e.g., those based on IP addressing) as a replacement for the existing circuit-switched network infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VoIP) technology are: improvements in the quality of IP telephony; the Internet phenomenon; emergence of standards; cost-effective price-points for advanced services via media-rich call management, et cetera. One of the emerging standards in this area is the well-known H.323 protocol, developed by the International Telecommunications Union (ITU) for multimedia conferencing over packet-based networks. Using the H.323 standard, devices such as personal computers can inter-operate seamlessly in a vast inter-network, sharing a mixture of audio, video, and data across all forms of packet-based and circuit-switched network portions.

The H.323 standard defines four major types of components for forming an inter-operable network: terminals, gateways, gatekeepers and multipoint control units (MCUs). In general, terminals, gateways and MCUs of an H.323-based network are referred to as "endpoints." Gateways are typically provided between networks (or network portions) that operate based on different standards or protocols. For example, one or more gateways may be provided between a packet-switched network portion and a circuit-switched network portion. Terminals are employed by end-users for accessing the network or portions thereof, for example, for placing or receiving a call, or for accessing multimedia content at a remote site.

The gatekeeper is typically defined as the entity on the network that provides address translation and controls access to the network for other H.323 components. Usually, a gatekeeper is provided with the address translation capability for a specified portion of the network called a "zone." Accordingly, a plurality of gatekeepers may be provided for carrying out address translation that is necessary for the entire network, each gatekeeper being responsible for a particular zone. In addition, gatekeepers may also provide other services to the terminals, gateways, and MCUs such as bandwidth management and gateway location.

The H.323 standard defines two types of addresses associated with each endpoint: a transport address (which, for example, corresponds to the IP address and the port address of a terminal operated by the end-user) and an alias address. An endpoint may have one or more aliases associated with it. Exemplary aliases may include the well-known E.164 telephone numbers, H.323 IDs (such as names, email-like addresses, etc.), and so on. The address translation service of the gatekeeper provides an alternative method of addressing an endpoint wherein a user-friendly alias (e.g., the E.164 telephone number) associated therewith may be translated into its appropriate transport address used by the protocol.

It can be readily appreciated that providing multiple endpoints, each having its own unique alias, within a single device (e.g., an information appliance (IA)) with one transport address is a very advantageous feature. For example, a single IA may be provided with a facsimile transmission function, a home telephone function, and a business telephone function, each operating as a separate endpoint having its own unique E.164 alias address. The IA itself is provided with a single transport address for facilitating the address translation associated with the endpoints. Accordingly, by concentrating multiple endpoints in a single transport address for a device, it is feasible to conserve the transport-related address space of the gatekeeper and help reduce the depletion of resources associated therewith.

Providing multiple endpoints in a single device is also useful in a VoIP telecommunications network wherein appropriate cellular telephone infrastructures are integrated within an H.323-based network via one or more gateways. For example, it is typically required that multiple mobile stations (MSs) be accessible at any time via a gateway in a VoIP network wherein each of the MSs are usually known only by their E.164 aliases. Again, the gateway is provided with a single, unique transport address for facilitating suitable address translation.

Current solutions for providing multiple endpoints in a single device have various drawbacks and shortcomings. For example, to allow multiple endpoints, the H.323 standard permits the use of dynamic values instead of a fixed value for the call signaling port. This feature has the disadvantage of allowing the access for one endpoint at a time. Moreover, it prevents interoperation with endpoints outside the zone of the governing gatekeeper except via a gateway in the zone.

Also, in the existing multiple endpoint solutions, when multiple aliases are mapped to a single transport address, all alias addresses associated with the transport address need to be registered at the gatekeeper at the same time. Consequently, if one of the plural endpoints needs to be replaced or changed for some reason, all the remaining endpoints are required to register again at the gatekeeper. In other words, the multiple endpoints cannot be registered separately or individually. For example, if five alias addresses are mapped to a single transport address, and one alias address is to be replaced or deleted, all five including the replacement alias or the other four (if one is merely deleted) aliases need to be re-registered at the gatekeeper. Those of ordinary skill in the art can readily appreciate that such a condition leads to unacceptable situations in VoIP cellular telephone systems where multiple MSs may have to be registered at the gatekeeper via a gateway at such different times as required by the end-users.

Based on the foregoing, it is apparent that in order to address these and other problems of the current solutions set forth above, what is needed is a system where multiple endpoints are provided within a single device such that individual registration/deregistration of the associated aliases is feasible. The present invention provides such a solution.

SUMMARY OF THE INVENTION

The present invention is directed to a method of registering multiple endpoints at a gatekeeper disposed in a packet-switched network. Preferably, the multiple endpoints, each having a separate alias address, are provided within a proxy device. The method then configures the proxy device by setting its alias and transport addresses. The proxy device is then registered at a registry associated with the gatekeeper, whereby the transport address and the alias address of the proxy device are matched. Each endpoint that is powered up is subsequently registered at the registry by associating the endpoint's alias address with the transport address of the proxy device without replacing the alias address of an endpoint that is previously registered.

In another aspect, a Voice-over-IP (VoIP) network system is provided advantageously in accordance with the teachings of the present invention. The VoIP network system comprises a packet-switched network portion including a gatekeeper and a plurality of terminals. A cellular telecommunications network portion is coupled to the packet-switched network portion via a gateway. Preferably, the gateway operates as a proxy device on behalf of a plurality of mobile stations disposed in the cellular telecommunications network portion. The VoIP network also includes means for registering each mobile station at the gatekeeper separately and independently.

In yet another aspect, the present invention is drawn to a registration method for registering a plurality of endpoints provided in a proxy device. The proxy device is preferably disposed in a packet-switched network having a gatekeeper. The registration method starts by configuring the proxy device by setting its alias address and port address. A Registration Request message which includes the alias address of the proxy device is sent from the proxy device to the gatekeeper. A registry table in the gatekeeper is updated in response to the Registration Request message received from the proxy device. The updating step includes the step of associating the alias address of the proxy device with its transport address. Thereafter, a Registration Confirm message is sent from the gatekeeper to the proxy device.

For each endpoint that is powered up, a Registration Request message is sent from the proxy device to the gatekeeper. This Registration Request message now includes the endpoint's alias address. In response, the registry table in the gatekeeper is updated based on each endpoint's alias address received in the Registration Request message by associating the alias address to the transport address of the proxy device and without replacing or deleting a previously registered alias address. A Registration Confirm message is sent from the gatekeeper to the proxy device after updating the registry table in the gatekeeper in response to each endpoint's alias address received.

BRIEF DESCRIPTION OF THE DRAWINGS

A more complete understanding of the present invention may be had by reference to the following Detailed Description when taken in conjunction with the accompanying drawings wherein:

FIG. 3 depicts a control message pathway for registering endpoints in a packet-switched network in accordance with the teachings of the present invention; and FIG. 4 depicts a flow chart for a presently preferred exemplary embodiment of the endpoint registration method provided in accordance with the teachings of the present invention.

DETAILED DESCRIPTION OF THE DRAWINGS

Figure 1:
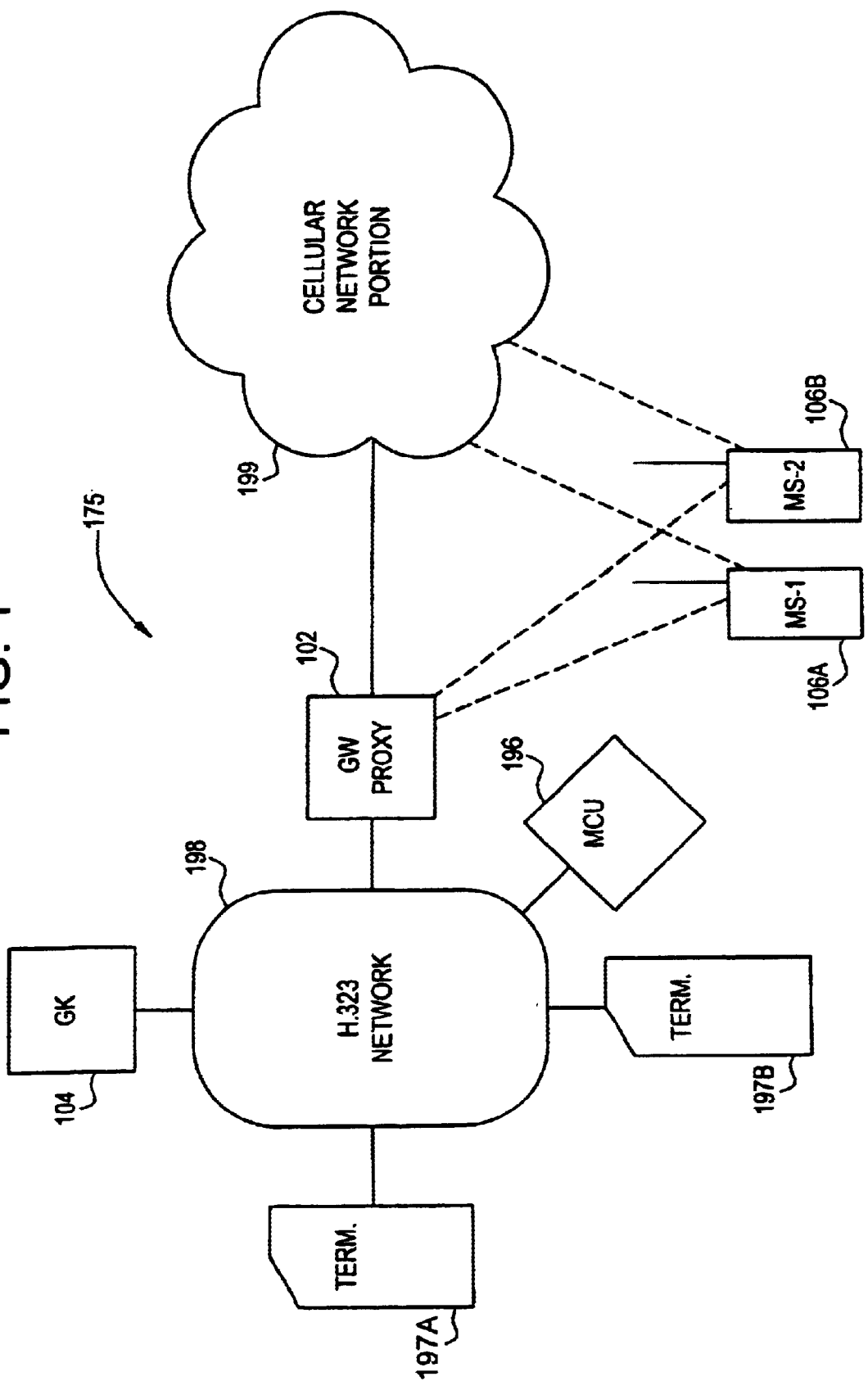
FIG. 1 depicts a functional block diagram of an integrated Voice-over-IP telecommunications network for providing wireless IP telephony wherein the teachings of the present invention may be advantageously practiced.

In the drawings, like or similar elements are designated with identical reference numerals throughout the several views, and the various elements depicted are not necessarily drawn to scale. Referring now to FIG. 1, depicted therein is a Voice-over-IP (VoIP) network 175 wherein multiple endpoints, for example, MS-1 106A and MS-2 106B, are advantageously provided in accordance with the teachings of the present invention. A cellular network portion 199 is coupled to a packet-switched network such as, for example, an H.323 network 198, via a gateway (GW) 102. In the context of providing multiple endpoints within a single device in accordance herewith, the gateway 102 may be described as a proxy device or an agent having a single transport address on behalf of a plurality of endpoints such as MS-1 106A and MS-106B, each having a unique E.164 alias. A plurality of H.323 terminals, e.g., terminal 197A and terminal 197B, a gatekeeper (GK) 104, and an MCU 196 are disposed on the H.323 network 198 in a conventional manner. Further, although not shown herein, it should be apparent that the cellular network portion 199 comprises conventional elements such as, for example, a Home Location Register (HLR) and associated Service Control Point (SCP), one or more Mobile Switching Centers (MSCs), one or more base stations, et cetera.

Figure 2:
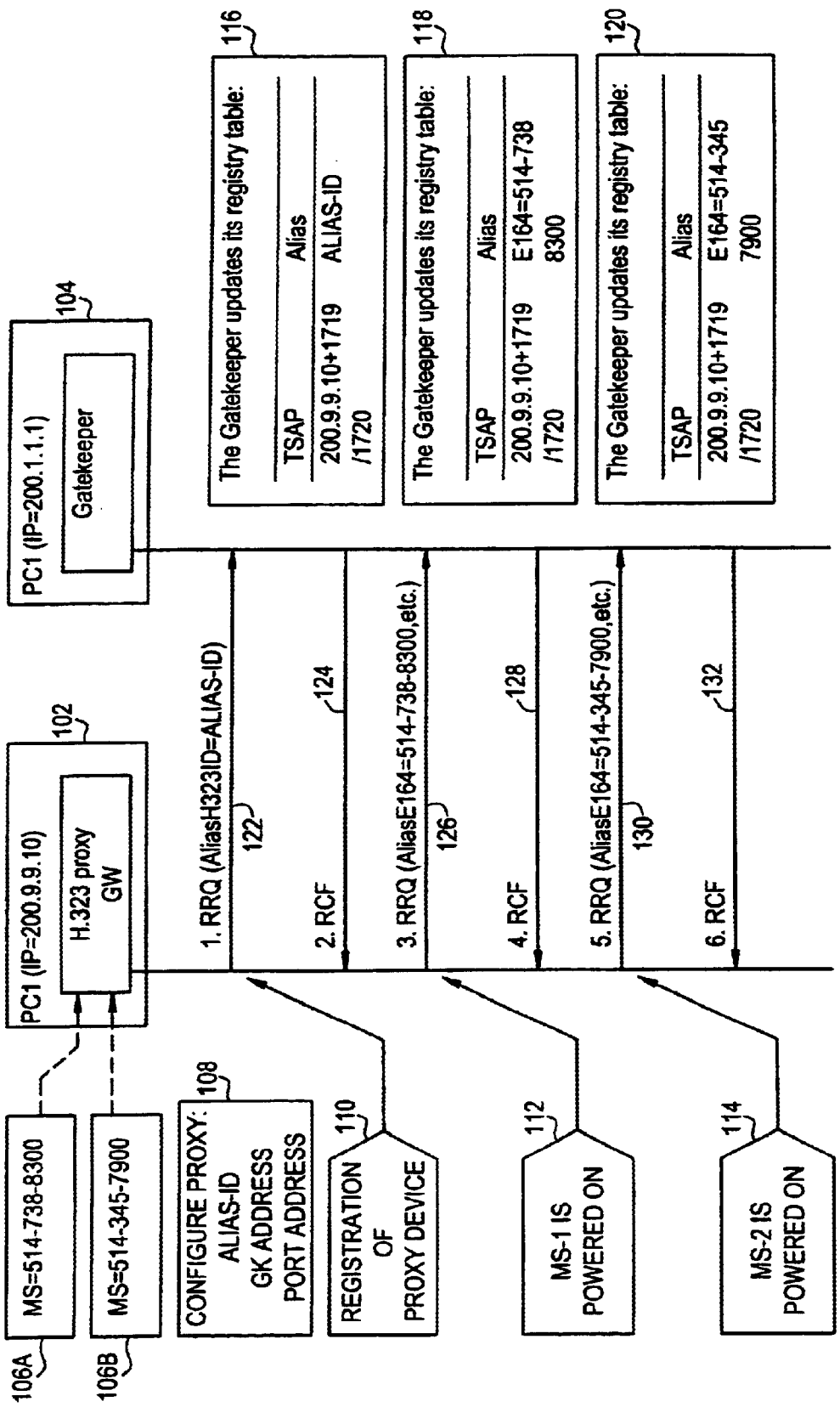
FIG. 2 (Prior Art) depicts a control message pathway illustrating a conventional endpoint registration method used in a packet-switched network.

Referring now to FIG. 2, a control message pathway is shown therein for illustrating a conventional endpoint registration method used in a packet-switched network such as, for example, the H.323-based VoIP network with two MSs as set forth above. Registration is the process by which an endpoint joins a specific portion of the network, i.e., a zone, and informs the governing gatekeeper of its transport address and alias addresses, if any. As is known, all endpoints typically register with a single gatekeeper as part of their configuration process. The endpoints and gatekeeper are typically identified through a discovery process at the initial power-up.

In the exemplary VoIP network 175 described with reference to FIG. 1, the GW/proxy 102 is initially configured at the power-up (step 108) wherein its alias (ALIAS_ID), gatekeeper's IP address (e.g., 200.1.1.1), and a port address associated with the proxy (e.g., 1719/1720) are set up. The IP address of the GW/proxy 102, for example, 200.9.9.10, is also known in the initial configuration process. When the GW proxy 102 is registered pursuant to the power-up (step 110), a Registration Request (RRQ) message 122 is sent by the proxy 102 to the GK 104. This RRQ message 122 contains the ALIAS_ID as a parameter and is sent to the Registration Access and Status (RAS) transport address of the GK 104. Upon receiving the RRQ message 122, the GK 104 updates its registry table (step 116) whereby the transport address of the proxy 102 (which is the IP address and the port address taken together, e.g., 200.9.9.10+1719/1720) is matched to the alias address, that is, ALIAS_ID, of the proxy. Subsequently, a Registration Confirm (RCF) message 124 is returned from the GK 104 to the proxy device 102.

When MS-1 106A (having an E.164 number, e.g., 514-738-8300) is powered on (step 112), an RRQ message 126 is repeated, but with a different alias address as its parameter. In this example, the alias address parameter is set as 514-738-8300, which is received by the GK 104. Conventionally, if a gatekeeper receives an RRQ message having the same transport address as a previous RRQ but with a different alias address, it replaces the translation registry table entry. Accordingly, the GK 104 updates its registry table (step 118) in response to the RRQ message 126 such that the transport address of the proxy 102 is now matched to the new alias address, that is, the E.164 number (514-738-8300) of MS-1 106A. Subsequent to the table entry update, an RCF message 128 is returned from the GK 104.

When the second mobile station, MS-2 106B (E.164 number=514-345-7900) is turned on (step 114), another RRQ message 130 is sent from the proxy 102 to the GK 104 for registration. This RRQ message 130 includes the E.164 number of MS-2 106B as a parameter. Upon receiving the RRQ message 130, the GK 104 conventionally updates its registry table (step 120) by replacing the alias associated with the transport address of the proxy device 102. Thereafter, an RCF message 132 is returned from the GK 104 to the proxy device.

Based on the foregoing discussion, one of ordinary skill in the art can readily appreciate that the use of a conventional endpoint registration scheme in a VoIP network application with multiple MSs precludes the possibility of supporting multiple endpoints within a single device, thereby leading to undesirable consequences as explained in the Background section.

FIG. 3 depicts a control message pathway for registering endpoints in a packet-switched network in accordance with the teachings of the present invention. Once again, the registration of multiple MSs within the VoIP network 175 (shown in FIG. 1) is exemplified herein. It should be readily understood that the control messages (messages 122–132) and steps (steps 108–114) are essentially the same as those described in detail in reference to FIG. 2. In response to these steps and associated control messages, the GK 104 updates its registry table entries by augmenting the alias addresses of the endpoints such that they all correspond with the same transport address of the GW/proxy device 102 without any replacement. Accordingly, as shown in steps 202 and 204, when the GK 104 receives an RRQ message having the same transport address but a different alias, the alias gets added to the registry translation table rather than replacing the previous alias address. Thus, a single transport address may have more than one alias address associated therewith in the gatekeeper provided in accordance with the teachings of the present invention.

Referring now to FIG. 4, a flow chart is provided for a presently preferred exemplary embodiment of the endpoint registration method for use in a packet-switched network. Initially, a proxy device (that is, a device acting as an agent on behalf of a plurality of endpoints and having a unique transport address) is configured in a manner described hereinabove (step 302). Thereafter, the proxy device is registered at a gatekeeper of the packet-switched network (step 304). Accordingly, an association between the transport and alias addresses of the proxy device is created in a registry/translation table of the gatekeeper. If there are no endpoints associated with the proxy device, the method stops (step 314). On the other hand, when the endpoints provided with the proxy device are to be registered, as shown by the decision block 306, each endpoint's alias address is sent to the gatekeeper (step 308) for adding to the registry maintained by the gatekeeper (step 310). This process is continued until all endpoints are registered at the gatekeeper (decision block 312). Once it is determined that there are no more endpoints associated with the proxy device to be registered, the registration method of the present invention stops (step 314). The registry table of the gatekeeper, accordingly, contains plural aliases (each corresponding to a particular endpoint) for a single transport address of the proxy device.

Based on the foregoing Detailed Description, those of ordinary skill in the art should realize that the present invention advantageously provides multiple endpoints in a single device without the drawbacks and shortcomings of the state-of-the-art solutions. The multiple endpoints provided in accordance herewith can register at a gatekeeper in an independent manner, thereby allowing flexibility needed in integrated VoIP and other packet-switched networks. Accordingly, multiple mobile stations may be associated with a single gateway acting as a proxy device on their behalf such that their aliases (for example, the E.164 numbers) can be independently and separately registered at the gateway of the wireless VoIP network.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims.

What is claimed is:

1. A method of registering multiple endpoints at a gatekeeper disposed in a packet-switched network wherein each endpoint is provided with a separate alias address, the method comprising the steps of:

providing a proxy device associated with the multiple endpoints;

configuring the proxy device by setting an alias address and a transport address therefor;

registering the proxy device at a registry associated with the gatekeeper, whereby the transport address and the alias address of the proxy device are matched; and registering each endpoint at the registry by associating the endpoint's alias address with the transport address of the proxy device without replacing a previously registered alias address.

2. The method as set forth in claim 1, wherein the transport address of the proxy device is set by augmenting the proxy device's Internet Protocol (IP) address with its port address.

3. The method as set forth in claim 2, wherein the alias addresses of the multiple endpoints comprise E.164 telephone numbers.

4. The method as set forth in claim 1, wherein the proxy device comprises a gateway and each endpoint comprises a mobile station having an E.164 number as its alias address, and further wherein the transport address of the proxy device is set by augmenting the proxy device's IP address with its port address.

5. The method as set forth in claim 1, wherein the step of configuring the proxy device comprises providing an IP address for the gatekeeper.

6. A registration method for registering a plurality of endpoints associated with a proxy device, wherein the proxy device is disposed in a packet-switched network having a gatekeeper, the method comprising the steps of:

configuring the proxy device by setting its alias address and port address;

sending a Registration Request message from the proxy device to the gatekeeper, the Registration Request message including the alias address of the proxy device;

updating a registry table in the gatekeeper in response to the Registration Request message received from the proxy device, the updating step comprising the step of associating the alias address of the proxy device with its transport address;

thereafter, sending a Registration Confirm message from the gatekeeper to the proxy device;

for each endpoint that is powered up, sending a Registration Request message from the proxy device to the gatekeeper, the Registration Request message including the endpoint's alias address;

updating the registry table in the gatekeeper in response to each endpoint's alias address received in the Registration Request message by associating the alias address to the transport address of the proxy device and without replacing a previously registered alias address; and sending a Registration Confirm message from the gatekeeper to the proxy device after updating the registry table in the gatekeeper in response to each endpoint's alias address received.

7. The registration method as set forth in claim 6, wherein the alias address of the proxy device comprises an alphanumerical name.

8. The registration method as set forth in claim 6, wherein the alias addresses of the plurality of endpoints comprise E.164 telephone numbers.

9. The registration method as set forth in claim 6, wherein the proxy device comprises a gateway and each endpoint comprises a mobile station disposed in a cellular telecommunications network portion.

10. The registration method as set forth in claim 6, wherein the proxy device comprises an information appliance and each endpoint comprises a telephone function having an E.164 number associated therewith.

11. A proxy device:

coupling a cellular telecommunications network portion to a packet-switched network portion;

operating in the packet-switched network portion on behalf of a plurality of mobile stations disposed in the cellular telecommunications network portion; and registering at least one of the plurality of mobile stations at a gatekeeper of the packet-switched network portion by associating an alias address of the at least one mobile station to a transport address of the proxy device without replacing a previously registered alias address.

12. The proxy device of claim 11, wherein the transport address of the proxy device is set by augmenting an Internet Protocol (IP) address of the proxy device with its port address.

13. The proxy device of claim 11, wherein the alias address of the at least one mobile station comprises E.164 telephone numbers.

\* \* \* \* \*